Stephen Sibley's Ventilating Horse Cover

No. 117,118

PATENTED JUL 18 1871

Witnesses
N. W. Stearns
W. J. Cambridge

Inventor
Stephen Sibley

UNITED STATES PATENT OFFICE.

STEPHEN SIBLEY, OF CHELSEA, MASSACHUSETTS.

IMPROVEMENT IN VENTILATED HORSE-COVERS.

Specification forming part of Letters Patent No. 117,118, dated July 18, 1871.

*To all whom it may concern:*

Be it known that I, STEPHEN SIBLEY, of Chelsea, in the county of Suffolk and State of Massachusetts, have invented an Improved Ventilating Horse-Cover, of which the following is a full, clear, and exact description, reference being had to the accompanying drawing making part of this specification, in which—

Figure 1:
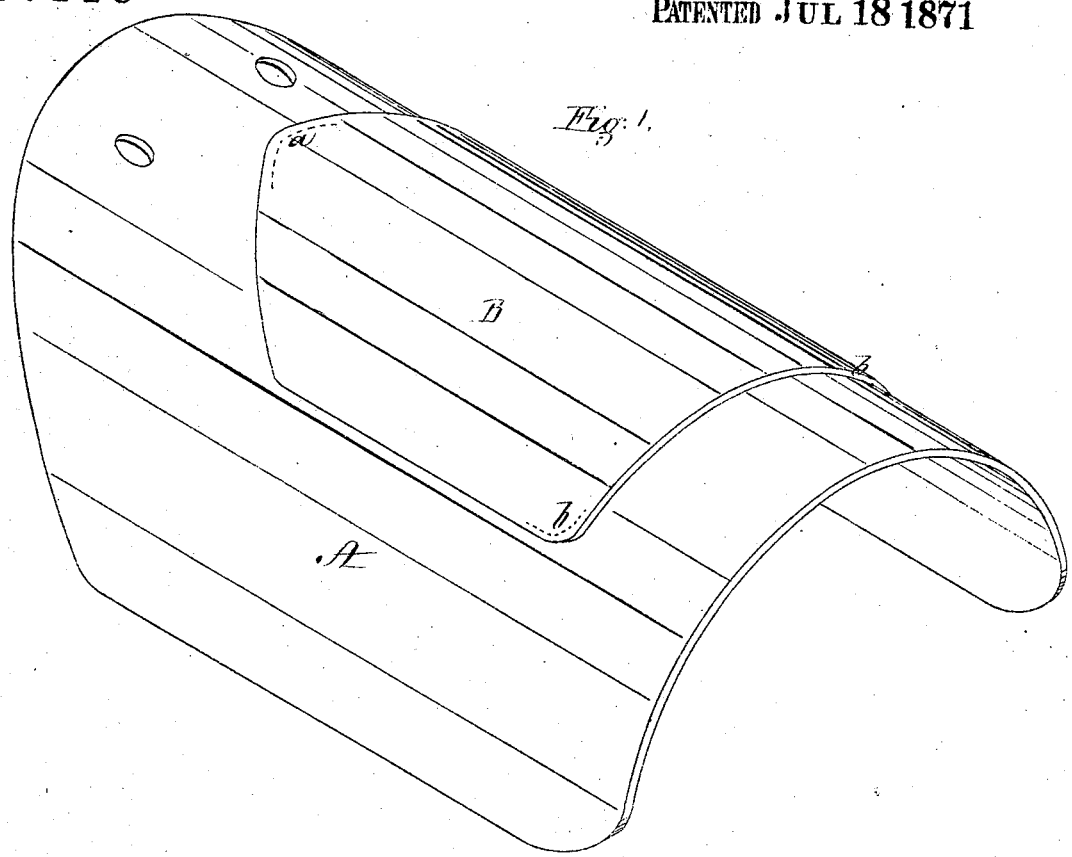
Figure 2:
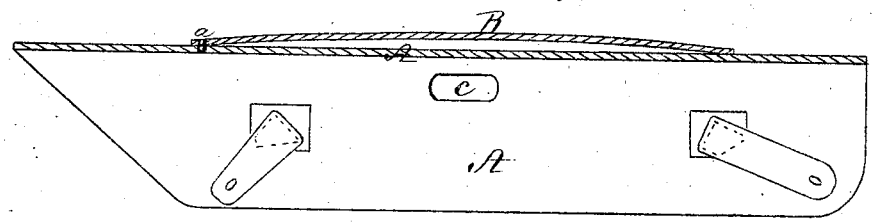
Figure 3:
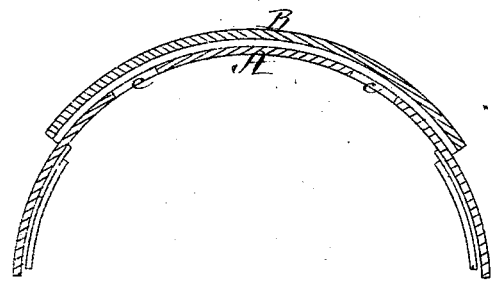

Figure 1 is a perspective view of my improved ventilating horse-cover. Fig. 2 is a longitudinal vertical section through the same. Fig. 3 is a transverse vertical section through the same.

The ordinary rubber or water-proof horse-cover is objectionable on account of its excluding the air and thus sweating the horse. To overcome this objection ventilated horse-covers have been constructed with openings, provided with caps or coverings, held open to admit the air by braces and springs; but these devices are complicated and liable to be broken or put out of order by careless handling.

My invention has for its object to enable me to dispense with these braces and springs, and to produce a horse-cover of simple construction which will allow the air to circulate freely between it and the body of the horse; and consists in making that portion of the cover which extends partially over the back and sides of the horse double, with one or more openings in the inner portion of the cover, through which the air passes when the two parts of the double portion are separated from each other by the motion of the horse.

To enable others skilled in the art to understand and use my invention, I will proceed to describe the manner in which I have carried it out.

In the said drawing, A represents a cover, which is made of suitable water-proof material and of a proper form to fit a horse. B is a piece of the same or other suitable material, which is secured, at $a\ b$, to the cover A, and is of sufficient size to extend partially over the back and sides of the horse. The portion of the cover provided with the piece B is thus made double, and the two parts of the double portion, being secured together at the ends only, are free to separate from each other as the horse moves, which allows the air to pass freely between them and through openings $c\ c$ in the cover A. And it will be seen that the alternate rise and fall of the portion B, caused by the motion of the horse in traveling, will tend to exhaust the air from beneath the cover and force it thereunder through the openings $c\ c$, the air thus admitted circulating freely under the cover and between it and the body of the horse, and insuring the desired ventilation, while the upper portion B effectually prevents the rain from entering the openings $c\ c$.

I do not confine myself to the number of openings $c\ c$, as one or more than two may be used, as preferred.

What I claim as my invention, and desire to secure by Letters Patent, is—

The within-described ventilating horse-cover, constructed with a double portion, A B, extending partially over the back and sides, and one or more openings, $c$, in the portion A, operating substantially in the manner and for the purpose set forth.

Witness my hand this 2d day of June A. D. 1871.

STEPHEN SIBLEY.

Witnesses:
N. W. STEARNS,
W. J. CAMBRIDGE.